United States Patent
Langer et al.

(10) Patent No.: US 9,612,064 B2
(45) Date of Patent: Apr. 4, 2017

(54) THERMALLY CONDUCTIVE COMPOSITE ELEMENT BASED ON EXPANDED GRAPHITE AND PRODUCTION METHOD

(71) Applicant: SGL CARBON SE, Wiesbaden (DE)

(72) Inventors: Werner Langer, Meitingen (DE);
Michael Steinroetter, Meitingen (DE);
Robert Michels, Meitingen (DE);
Werner Guckert, Meitingen (DE)

(73) Assignee: SGL Carbon SE, Wiesbaden (DE)

( * ) Notice: Subject to any disclaimer, the term of this patent is extended or adjusted under 35 U.S.C. 154(b) by 277 days.

(21) Appl. No.: 14/485,987

(22) Filed: Sep. 15, 2014

(65) Prior Publication Data

US 2015/0000888 A1  Jan. 1, 2015

Related U.S. Application Data

(63) Continuation of application No. PCT/EP2013/054273, filed on Mar. 4, 2013.

(30) Foreign Application Priority Data

Mar. 15, 2012 (DE) .......... 10 2012 204 124

(51) Int. Cl.
| | |
|---|---|
| *F28F 3/12* | (2006.01) |
| *F28F 21/02* | (2006.01) |
| *B32B 9/00* | (2006.01) |
| *B32B 3/26* | (2006.01) |
| *B32B 37/02* | (2006.01) |
| *B32B 37/16* | (2006.01) |

(52) U.S. Cl.
CPC .......... *F28F 21/02* (2013.01); *B32B 3/26* (2013.01); *B32B 9/007* (2013.01); *B32B 37/02* (2013.01); *B32B 37/16* (2013.01); *B32B 2307/302* (2013.01); *B32B 2309/12* (2013.01); *Y10T 156/10* (2015.01)

(58) Field of Classification Search
CPC  B32B 3/26; B32B 9/007; B32B 37/02; B32B 37/16; B32B 2307/302; B32B 2309/12; F28F 21/02; F28F 7/02; Y10T 156/10
USPC ................................. 165/168, 172
See application file for complete search history.

(56) References Cited

U.S. PATENT DOCUMENTS 4,576,845 A * 3/1986 Krotchko .......... D21F 3/08
162/232
5,345,300 A * 9/1994 Uehara .......... G03G 15/206
219/216

(Continued)

FOREIGN PATENT DOCUMENTS

CA  2480576 A1  3/2005
CA  2786134 A1  7/2011

(Continued)

*Primary Examiner* — Davis Hwu
(74) *Attorney, Agent, or Firm* — Laurence A. Greenberg; Werner H. Stemer; Ralph E. Locher

(57) ABSTRACT

A thermally conductive composite element is particularly suited for use in a surface heating system or in a surface cooling system. The composite element has at least one main part which contains expanded graphite and at least one flat textile structure disposed on one face of the main part. The textile structure is connected to the face of the main part by an inorganic adhesive.

20 Claims, 1 Drawing Sheet

(56) References Cited

U.S. PATENT DOCUMENTS

| | | | |
|---|---|---|---|
| 6,442,365 B1 * | 8/2002 | Schlueter, Jr. | G03G 15/2057 |
| | | | 399/328 |
| 7,132,629 B2 | 11/2006 | Guckert et al. | |
| 7,520,953 B2 | 4/2009 | Guckert et al. | |
| 8,382,004 B2 | 2/2013 | Asmussen et al. | |
| 2007/0259185 A1 | 11/2007 | Hingst et al. | |
| 2010/0326645 A1 * | 12/2010 | Fan | B82Y 30/00 |
| | | | 165/185 |
| 2013/0040194 A1 | 2/2013 | Öttinger et al. | |
| 2013/0209858 A1 | 8/2013 | Schmitt et al. | |

FOREIGN PATENT DOCUMENTS

| | | |
|---|---|---|
| CN | 1683131 A | 10/2005 |
| CN | 101134678 A | 3/2008 |
| CN | 101326406 A | 12/2008 |
| CN | 101855071 A | 10/2010 |
| DE | 102009055442 A1 | 7/2011 |
| EP | 1512933 A2 | 3/2005 |

* cited by examiner

THERMALLY CONDUCTIVE COMPOSITE ELEMENT BASED ON EXPANDED GRAPHITE AND PRODUCTION METHOD

CROSS-REFERENCE TO RELATED APPLICATION

This application is a continuation, under 35 U.S.C. §120, of copending international application PCT/EP2013/054273, filed Mar. 4, 2013, which designated the United States; this application also claims the priority, under 35 U.S.C. §119, of German patent application DE 10 2012 204 124.9, filed Mar. 15, 2012; the prior applications are herewith incorporated by reference in their entirety.

BACKGROUND OF THE INVENTION

Field of the Invention

The present invention relates to a thermally conductive composite element based on expanded graphite, a method for the production thereof and also its industrial and technical implementation.

Thermally conductive composite elements of the generic kind are used as thermally conductive elements in surface heating and surface cooling, such as in underfloor, wall and ceiling heating, for example, in order to distribute the coolness emitted by the surface cooling or the heat emitted by the surface heating in the surface uniformly and emit it into the space surrounding said surface, in order thereby to achieve a pleasant indoor temperature. Composite elements of the kind usually comprise a thermally conductive plate in which a pipe body through which a heat transfer medium can flow, such as a pipe coil or pipe meander, for example, is embedded. Alternatively to this, thermally conductive plates of this kind may also be used without pipe bodies embedded therein, such as in the case of concrete core activation, for example, in which thermally conductive plates are arranged beneath a concrete floor, in which the pipe body is arranged through which the heat transfer medium can flow.

In order to achieve good heat distribution in the surface, thermally conductive plates of this kind frequently contain expanded graphite. Expanded graphite, also referred to as expandable graphite, is produced by the expansion of natural graphite, in that an intercalation compound such as sulphuric acid, for example, is initially incorporated in graphite, before the graphite treated in this manner is expanded by heating by a factor of 200 to 500. Graphite is known to comprise individual layers of graphene in which carbon atoms are covalently connected to one another, whereas the individual layers are only weakly connected to one another. Due to this structure, graphite exhibits anisotropic properties and, in particular, an anisotropic heat conductivity, wherein the heat conductivity in the plane of graphite layers is greater than in the direction perpendicular thereto. Following expansion, the graphite is compressed again, but to a lower density than the starting density, so that the layers of graphene in the graphite are preferably arranged perpendicularly to the direction of influence of the pressure and the individual graphite aggregates formed during expansion are hooked to one another, in order thereby to produce self-supporting, planar plates without the addition of binding agents. Plates of this kind exhibit a high degree of anisotropy in relation to heat conductivity and high heat conductivity in the plane or surface of the plate. In addition, expanded graphite exhibits a certain heat storage capacity on account of its high heat conductivity and high porosity. Due to their high heat conductivity in the plane and their heat storage capacity, heat conductivity plates of this kind arranged above a pipe body through which a heat transfer medium flows, such as a pipe meander or pipe spiral, and made of expanded graphite achieve a uniform heat distribution even over large surfaces and emit the heat supplied to them by the pipe body uniformly into the space surrounding them.

However, expanded graphite is comparatively soft, which is why existing thermally conductive plates made of expanded graphite exhibit a low degree of strength and a low degree of stiffness. Although these plates are self-supporting in principle, they are not therefore suitable for use in the construction sector without additional reinforcement.

In order to increase the stiffness of thermally conductive plates made of expanded graphite, it has already been proposed that one or a plurality of organic filling materials should be added to the expanded graphite. A thermally conductive plate is described in the commonly assigned patent application publication US 2013/0209858 A1 and its counterpart German published patent application DE 10 2009 055 442 A1, for example. The plate contains a consolidated mixture of graphite particles and plastic particles, wherein the graphite particles are preferably made of expanded graphite. In order to achieve sufficient stiffness, the mixture preferably contains 20 to 50% by wt. plastic particles such as polyvinyl chloride particles, for example. Due to the high proportion of organic filling material particles, these thermally conductive plates exhibit a high fire load, however, which makes these unsatisfactory for safety reasons.

SUMMARY OF THE INVENTION

It is accordingly an object of the invention to provide a plate-shaped, thermally conductive building element, which overcomes the disadvantages of the heretofore-known devices of this general type and which provide for plate-shaped element which exhibits outstanding heat-conductivity, particularly in the plane, high strength and also high stiffness, so as to render it suitable for use as a thermally conductive element in surface cooling and surface heating, such as in underfloor, wall and ceiling heating, for example.

With the above and other objects in view there is provided, in accordance with the invention, a thermally conductive composite element for a surface cooling and/or surface heating system, the composite element, comprising:
at least one mold containing expanded graphite;
at least one textile fabric disposed on the at least one side of the mold; and
an inorganic adhesive connecting the at least one textile fabric to the mold.

In other words, according to the invention, the objects are achieved by the provision of a thermally conductive composite element which comprises at least one mold containing expanded graphite and also at least one textile fabric arranged on at least one side of the mold, wherein the at least one textile fabric is connected to the mold by means of an inorganic adhesive.

This solution is based on the surprising finding that by adhering a textile fabric to at least one side of a mold based on expanded graphite, the stiffness of the mold made of expanded graphite can be substantially increased, without a stiffening material, such as an organic filling material, for example, having to be added to the expanded graphite. This is based on the fact that due to the low elasticity with simultaneously high tensile strength of the fibers contained in the textile fabric, the bend resistance of the mold can be substantially improved, because during the action of bending forces on the composite element, the fibers in the textile fabric are stressed and due to their low elasticity and high tensile strength, they absorb the bending forces without expanding significantly. Because the stiffness of the mold is thereby significantly increased through the provision of the textile fabric on at least one side of the mold based on expanded graphite, in the case of the thermally conductive composite element according to the invention, the addition of organic filling materials which exhibit a high fire load, as shown, to the expanded graphite can be dispensed with. Since in addition to the adhesion of the textile fabric to the expanded graphite mold, an inorganic adhesive is used which exhibits no fire load, a thermally conductive composite element is obtained, which exhibits no fire load or possibly only a very low fire load. In addition, the composite element according to the invention is characterized on account of the expanded graphite contained in the mold by outstanding heat conductivity, particularly in the plane, and on account of the comparatively low density of expanded graphite by a comparatively low weight. Due to its low fire load, its outstanding heat conductivity, particularly in the plane, its high strength, its low weight and also its great stiffness, the composite element according to the invention is outstandingly suitable for use as, among other things, a thermally conductive element in surface cooling and surface heating, such as in underfloor, wall and ceiling heating, for example.

Textile fabrics within the meaning of the present invention are all fabrics which contain fibers.

As described, the thermally conductive composite element according to the invention is particularly suitable for use in surface cooling or in surface heating, such as in underfloor, wall or ceiling heating, in particular. To this end, the composite element according to the invention comprises a pipe body through which a heat transfer medium, in other words a heating medium or a cooling medium, flows according to a preferred embodiment of the present invention, which pipe body is preferably embedded in the at least one mold containing expanded graphite. The pipe body in this case may be partially or completely embedded in the at least one mold containing expanded graphite, wherein it is preferable, however, for the pipe body to be embedded completely and at least substantially centrally in the at least one mold containing expanded graphite. If the composite element contains a plurality of molds containing expanded graphite, such as two such molds, for example, the pipe body may also be embedded between the two molds, which can be achieved due to the high compressibility of expanded graphite, for example, in that the pipe body is arranged between the two molds containing expanded graphite and the structure produced in this manner is then pressed, in order to compress the expanded graphite contained in the molds and thereby simultaneously embed the pipe body in the expanded graphite.

The pipe body may be each pipe body customarily used in surface cooling and surface heating, such as a pipe body configured in a meandering or spiral shape, for example. Irrespective of the concrete embodiment of the pipe body, the mold or one of the molds surrounding the pipe body contains two holes, one of which acts as the inlet for one end of the pipe body and the other as the outlet for the other end of the pipe body.

In order to achieve good thermal conductivity between the pipe body and the expanded graphite of the at least one mold, it is proposed as a development of the basic ideal underlying the invention that the pipe body should be made of plastic, ceramic, graphite or metal, such as preferably copper, in particular.

As described above, the pipe body is purely optional, since the composite element according to the invention can also be used without pipe bodies embedded therein for air-conditioning, such as for concrete core activation, for example, in that the composite element is arranged beneath a concrete floor, for example, in which the pipe body through which the cooling or heat transfer medium can flow, is arranged.

According to the invention, the at least one mold is connected to the textile fabric via an inorganic adhesive, because inorganic adhesives have the advantage of exhibiting a high adhesive force but no fire load or else only a low fire load. All known filling materials can be used as inorganic filling materials, such as inorganic adhesives, for example, which are chosen from the group made up of silicates, colloidal silicic acid, phosphates, oxides, sulfates, borates and any mixtures of two or more of the aforementioned kinds of adhesive.

The inorganic adhesive is preferably provided between the mold and the textile fabric in a quantity of 10 to 1,000 g/m$^2$, particularly preferably of 100 to 500 g/m$^2$ and quite particularly preferably of 200 to 300 g/m$^2$, such as roughly 250 g/m$^2$, for example.

Particularly good results are obtained when the inorganic adhesive is a geopolymer and/or water glass. The geopolymers are usually silicate-based adhesives and the water glass a melt of solidified, amorphous and water-soluble sodium, lithium and potassium silicates, so that the term geopolymer includes water glass. Water glass in this case is particularly preferable for the composite element of the present invention because it is not only characterized by a high wettability on almost all surfaces but, in particular, also a high strength, high heat resistance and quick hardening. Apart from this, water glass is comparatively cheap.

As set out above, the adhesion of the at least one textile fabric to at least one side of the at least one mold based on expanded graphite increases the stiffness of the mold considerably. This effect is achieved particularly well when the at least one textile fabric is chosen from the group which comprises non-woven fabrics, non-crimp fabrics, woven fabrics, knitted fabrics, knotted fabrics, felts, paper, cardboard and any mixtures of two or more of the aforementioned kinds of fabrics. As described above, a textile fabric according to the present invention is understood to mean any fabric which contains fibers, so including paper and cardboard, which contain cellulose fibers. Good results are particularly obtained with woven fabrics and non-woven fabrics, which is why these are particularly preferred as the textile fabric according to the present invention.

In principle, the textile fabric provided in the composite element according to the invention may contain fibers from all materials known to the person skilled in the art. Good results are particularly obtained using textile fabrics based on fibers which are chosen from the group comprising glass fibers, carbon fibers, hemp fibers, mineral fibers, cement-coated mineral fiber structures, cellulose fibers and any mixtures of two or more of the aforementioned kinds of fibers. In this case, glass fibers, carbon fibers and mineral fibers are particularly preferable due to their outstanding tensile strength, while glass fibers are quite particularly preferred due to their comparatively low price.

According to a further particularly preferred embodiment of the present invention, the at least one textile fabric contained in the composite element according to the invention is a fiberglass fabric or a non-woven fiberglass fabric.

The at least one textile fabric contained in the composite element according to the invention is preferably made from fibers exhibiting a length of 0.1 to 100 mm, preferably of 1 to 50 mm and particularly preferably of 5 to 20 mm.

According to a further preferred embodiment of the invention, the at least one textile fabric is made from fibers with a diameter of 1 to 100 μm, preferably of 5 to 50 μm and particularly preferably of 10 to 15 μm.

In order to achieve a sufficient increase in the stiffness of the at least one mold based on expanded graphite provided in the composite element according to the invention, it is proposed in a development of the basic idea underlying the invention that the at least one textile fabric exhibits a thickness of 0.1 to 1.0 mm, preferably of 0.2 to 0.8 mm and particularly preferably of 0.4 to 0.6 mm.

In order to be capable of being used as the thermally conductive element, the at least one mold containing expanded graphite, which determines the form of the composite element according to the invention, is configured at least substantially in plate form, wherein the at least one textile fabric is arranged on the upper and/or lower side of the plate-shaped mold, in other words on one of the or both largest faces of the mold.

According to the invention, the at least one mold of the composite element according to the invention contains expanded graphite, because this exhibits good heat-conductivity, in particular in the surface or plane, and also a certain heat-storage capacity. Expanded graphite within the scope of the present invention is understood to mean graphite which is expanded in comparison with untreated natural graphite. As described above, expanded graphite of this kind is produced by integrating an intercalation compound, such as sulfuric acid, for example, in graphite to begin with before the graphite treated in this manner is expanded by heating by a factor of 200 to 500, for example, and then compressed again to a smaller density than the starting density, for example, so that a self-supporting, planar mold is thereby produced with the addition of binding agents. Consequently, the expanded graphite, strictly speaking, is compressed, expanded graphite. However since the density of the compressed, expanded graphite is smaller than that of natural graphite, this graphite is generally referred to as expanded graphite.

Good results are particularly obtained when the at least one mold contains expanded graphite with a density of 0.02 to 0.5 g/cm$^3$, preferably of 0.04 to 0.3 g/cm$^3$ and particularly preferably of 0.05 to 0.2 g/cm$^3$. If the density of the expanded graphite is too low, this exhibits no inherent strength, which means that the mold made from it is not dimensionally stable. On the other hand, if the density of the expanded graphite is too great, the mold resulting from it cannot be compressed.

As a development of the basic idea underlying the invention, it is proposed that the at least one mold contains expanded graphite with a surface weight of 100 to 4,000 g/cm$^2$, preferably of 350 to 3,500 g/cm$^2$ and particularly preferably of 500 to 2,000 g/cm$^2$.

According to a quite particularly preferred embodiment of the present invention, the at least one mold is made of expanded graphite, i.e. this contains no further constituents apart from expanded graphite, so in particular no constituents with a high fire load, such as organic filling materials, either.

The mold containing at least expanded graphite exhibits a thickness of 8 to 80 mm, preferably of 10 to 50 mm and particularly preferably of 12 to 25 mm.

Particularly if the composite element according to the invention comprises a pipe body, it is preferable for the composite element according to the invention to have two molds each containing expanded graphite and particularly preferably two molds consisting of expanded graphite, which are connected to one another via an inorganic adhesive. The high compressibility of expanded graphite means that by arranging a pipe body through which a heat transfer medium can flow between the two molds and pressing the assembly thereby created, an embedding of the pipe body in the expanded graphite surrounding the pipe body can easily be achieved, wherein the pipe body is preferably arranged centrally, i.e. at the interface between the two molds. With this embodiment it is preferable for a textile fabric to be provided on the side of each of the two molds lying opposite the pipe body, said fabric being connected to the mold in each case by means of an inorganic filling material.

According to a further preferred embodiment of the present invention, the composite element according to the invention exhibits edge protection. The provision of this kind of edge protection is not only preferred, in order to protect the edges of the composite element from mechanical damage, but in particular also to protect the composite element from moisture penetration. During its use, condensation may form on the composite element, particularly when there are rapid and large temperature changes, which condensation can get into the sides of the mold or molds in the absence of any edge protection of this kind, where it can lead to an undesirable loss of strength in the expanded graphite.

On at least one of the edge sides of the composite element, an L-shaped component which is preferably made of metal or plastic, a U-shaped component which is preferably made of metal or plastic and/or a coating may be provided as the edge protection. These edge protection means may be connected to the mold or molds in any manner and preferably mounted on or adhered to the composite element, wherein in the latter case a hydrophobic adhesive is particularly used as the adhesive, in order to protect the mold or molds from the ingress of moisture via its/their edges. An adhesive based on fluorine-containing acrylic may be used as the hydrophobic adhesive, for example. Although an organic adhesive of this kind exhibits a negligible fire load, it need only be used in a very small quantity as edge protection, so that the use thereof means that the total fire load of the composite element is barely changed.

Alternatively or in addition to this, it is also possible for the composite element to be inserted or adhered into a frame made of metal and/or non-woven fabric, in particular non-woven fiberglass or carbon fiber fabric. Particularly in the case of the aforementioned alternative, noise insulation is also achieved in addition to the edge protection.

In addition, a coating can be applied to one or a plurality of outer sides of the composite element and in particular to the at least one textile fabric, in order to adapt the composite element to customer requirements. The most common coating materials in this case are paints, varnishes, hydrophobic products, fire-protection agents and similar.

With the above and other objects in view there is also provided, in accordance with the invention, a method of producing a thermally conductive composite element as described herein. The method comprises the following steps:

i) provision of a first and a second plate-shaped premolding, wherein the two premoldings each contain expanded graphite and are preferably made of expanded graphite, ii) arrangement of a pipe body through which a transfer medium can flow between the upper side of the first premolding and the lower side of the second premolding, iii) pressing of the assembly obtained in step ii), wherein in step i) at least one textile fabric is applied to at least one of the sides of the premoldings lying opposite the pipe body in the subsequent composite element and/or following step iii) at least one textile fabric is applied to the upper side and/or lower side of the embodiment obtained in step iii).

In order to achieve a particularly good connection of the premoldings to one another and to the at least one textile fabric, it is proposed in a development of the basic idea underlying the invention that the method according to the invention should be realized in such a manner that it comprises the following steps in addition to those already described:

application of an inorganic adhesive to the upper side and the lower side of the first premolding, application of a textile fabric to the upper side or lower side of the first premolding provided with adhesive and arrangement of a pipe body on the side of the first premolding lying opposite the textile fabric, application of an inorganic adhesive to the upper side or the lower side of the second premolding, application of a textile fabric to the upper side or lower side of the second premolding provided with adhesive, arrangement of the second premolding obtained in step d) with its side lying opposite the textile fabric downwards on the pipe body of the assembly obtained in step b) and pressing of the structure obtained in step e).

In the aforementioned embodiment, the inorganic adhesive is preferably applied to the corresponding sides of the premoldings in a full-surface manner. The premolding in this context is understood to be a mold made of expanded graphite, wherein the expanded graphite has a smaller density than that of the expanded graphite in the final mold. The preform is changed into the final mold by pressing at step f).

A preform is preferably used in step b) and/or in step c) which exhibits two holes, one of which acts as the inlet for one end of the pipe body and the other as the outlet for the other end of the pipe body. These holes may be introduced into the preform in all manners known to the person skilled in the art, such as punching for example.

Good results are particularly obtained when two premoldings are used in step i), each of which is made of expanded graphite with a density of between 0.02 and 0.05 g/cm$^3$.

According to a further preferred embodiment of the present invention, water glass is used in process steps a) and c) as an inorganic adhesive.

It is proposed as a development of the basic idea underlying the invention that non-woven fiberglass fabric should be used in each of the process steps b) and d) as the textile fabric.

In process step f), the structure is preferably pressed at a pressure of 0.02 to 5 MPa and preferably of 0.1 to 1 MPa.

A further subject-matter of the present invention is the use of the previously described thermally conductive composite element in surface cooling or in surface heating and preferably in underfloor, wall or ceiling heating. Moreover, the thermally conductive composite elements described can be used for the surface cooling and heating of machinery and equipment, such as photovoltaic cells, temperature chambers, housings for power electronics, battery cells, in particular battery packs containing lithium-ion battery cells, for cooling medical equipment such as CT scanners and MRI scanners, for air-conditioning in motor vehicles such as buses, heavy-goods vehicles and the like, for air-conditioning in ships and aircraft cabins, for temperature-control basins in swimming pools and the like.

Other features which are considered as characteristic for the invention are set forth in the appended claims.

Although the invention is illustrated and described herein as embodied in a thermally conductive composite element based on expanded graphite, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DETAILED DESCRIPTION OF THE INVENTION

Figure 1:
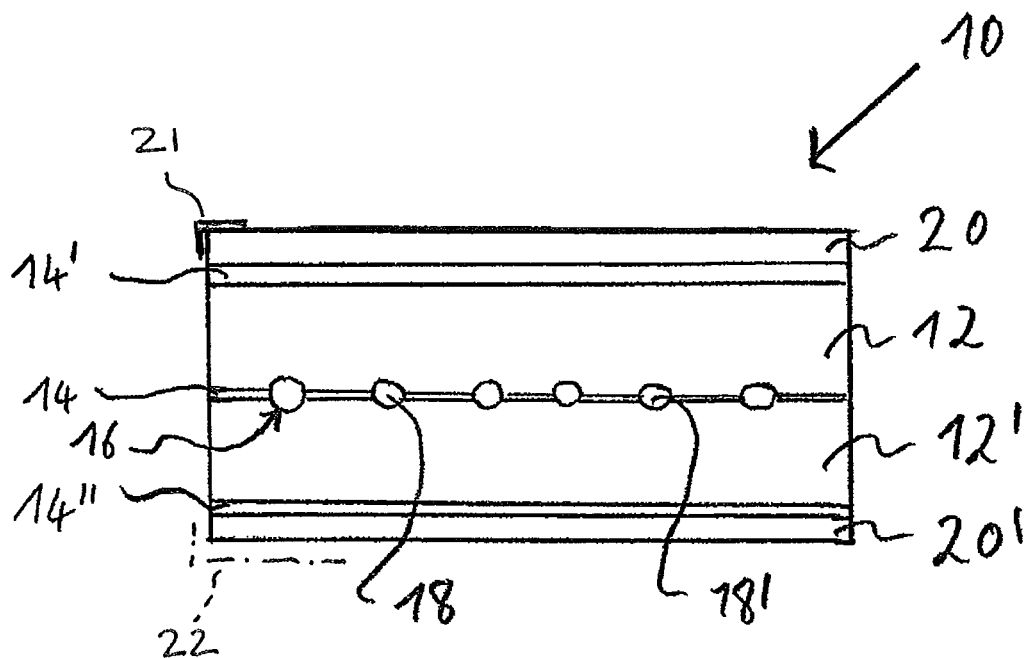
FIG. 1 is a schematic cross section of a composite element according to an exemplary embodiment of the present invention.
Figure 2:
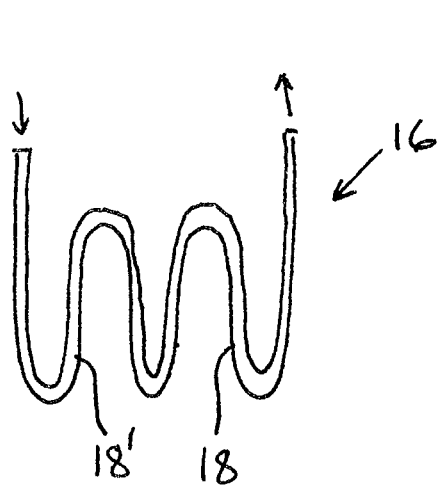
FIG. 2 is a diagram of a pipe body formed for conducting heat exchange medium through the composite element.
Figure 3:
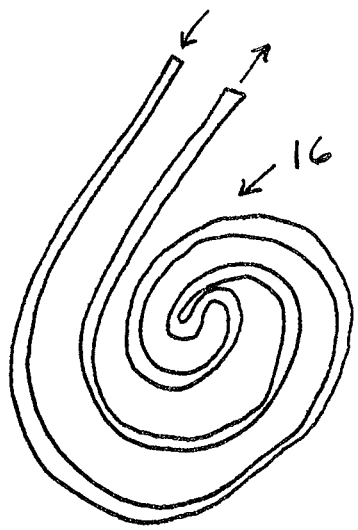
FIG. 3 is a diagram of an alternatively shaped pipe body.

Referring now to the figures of the drawing in detail, there is shown a composite element 10 that comprises two molds 12, 12' which are each made of expanded graphite, i.e., they essentially consist of expanded graphite. They do not contain any further constituents apart from expanded graphite and in particular no organic filling materials. In this case, the two molds 12, 12' are connected to one another by an inorganic adhesive 14, wherein the adhesive layer 14 in the figure is drawn in thicker in the interests of visual clarity than it is in reality. Moreover, at the interface between the two molds 12, 12' a meander-shaped pipe body 16 is provided and embedded in the two molds 12, 12', wherein of the pipe body 16 in the figure a total of 6 windings 18, 18' are shown. The pipe body has an internally hollow configuration and can therefore have a heat transfer medium flowing through it. On the upper side of the upper mold 12 and on the lower side of the lower mold 12', a non-woven fiberglass fabric is provided as the textile fabric 20, 20' in each case. The two textile fabrics 20, 20' are connected to the molds 12, 12' via an inorganic adhesive 14', 14", respectively. In this case as well, the adhesive layers 14', 14" are illustrated with an greater thickness than they would appear in reality.

The edges and corners of the assembly may be protected by way of an edge protection element 21. The latter may also be integrated and formed directly in the textile fabrics 20 and/or 20'. In a preferred embodiment, the edge protection is an L-shaped component made of metal or plastic, a U-shaped component which is preferably made of metal or plastic or a coating is provided as the edge protection on at least one of the edge sides of the composite element 10.

There may also be provided a frame 22 of metal and/or a non-woven fabric disposed to encase the composite element 10. An exemplary frame is shown in highly diagrammatic form in FIG. 1.

The present invention is described below with the help of an example explaining the invention. The example is not to be understood as limiting the invention.

EXAMPLE

Two plate-shaped premoldings made of expanded graphite were provided. Each of the plates has a surface area of 625×625 mm$^2$, a thickness of 15 mm and a surface weight of 1,000 g/m$^2$.

On the upper and lower sides of a first of the two premoldings, water glass with an application quantity of 60 g per side was applied as an adhesive, wherein a product manufactured by Merck was used as the water glass. After this, a non-woven fiberglass fabric with a surface weight of 60 g/m$^2$ and a thickness of 0.6 mm made of glass fibers with a diameter of 13 µm was applied to one of the two sides of the premolding coated with adhesive, pressed on and the adhesive allowed to dry.

In addition, the aforementioned product with an application quantity of 100 g was applied to one of the upper and lower sides of the second premolding as the adhesive and then two holes were punched in this premolding, which holes act as the inlet and outlet for the pipe body being fitted. After this, a non-woven fiberglass fabric with a surface weight of 60 g/m$^2$ and with a thickness of 0.6 mm made of glass fibers with a diameter of 13 µm was applied to the side of the premolding coated with adhesive, pressed on and the adhesive allowed to dry.

A meander-shaped copper pipe body was then arranged on the side of the first premolding lying opposite the non-woven fiberglass fabric and the premolding was then arranged with its side opposite the non-woven fiberglass fabric downwards. This structure was then pressed in a press mold with spacers inserted in it to the desired height. The retention time in this case was 5 to 10 seconds.

The composite element produced in this way was stiff and had no fire load. Both the individual components of the composite element, in other words adhesive, graphite and non-woven fabric, and also the entire composite element were not combustible or inflammable. In particular, samples of the composite element produced with a diameter of 45 mm and a height of 40 mm to 60 mm did not burn when they were heat-treated at 800° C. in a box-type furnace. The composite element showed no sag when supported on a wooden frame with a web width of 2 cm. When the composite element was loaded with 10 kg on a surface of 70.9 cm$^2$ in the centre of the plate, the measurable sag was only 2 mm.

COMPARATIVE EXAMPLE

A composite element such as that described in the above example was produced, except that rather than the water glass adhesive, an organic adhesive was used and the premoldings created from a mixture of expanded graphite and 20% by weight polyvinyl chloride particles as an organic filling material.

Samples of the composite element produced in this manner with the dimensions referred to in the first-mentioned example burned for 26 seconds with an open flame when they were heat-treated at 800° C. in a box-type furnace.

The following is a summary list of reference numerals and the corresponding structure used in the above description of the invention:

10 Composite element
12, 12' Mold made of expanded graphite
14, 14', 14" Adhesive/adhesive layer
16 Meander-shaped pipe body
18, 18' Windings of the pipe body
20, 20' Textile fabric
21 Edge protection element
22 Encasement frame

The invention claimed is:

1. A thermally conductive composite element for a surface cooling and/or surface heating system, the composite element, comprising:
   at least one mold containing expanded graphite and being formed with at least one side;
   at least one textile fabric disposed on said at least one side of said mold;
   an inorganic adhesive connecting said at least one textile fabric to said mold; and
   a pipe body configured for conducting a heat transfer medium and embedded in said at least one mold containing expanded graphite.

2. The composite element according to claim 1, wherein said pipe body has a meandering shape or a spiral shape.

3. The composite element according to claim 1, wherein said at least one mold containing expanded graphite is configured at least substantially as a plate-shaped mold and said at least one textile fabric disposed on an upper side and/or on a lower side of said plate-shaped mold.

4. The composite element according to claim 1, wherein said at least one mold contains expanded graphite with a density of 0.02 to 0.5 g/cm$^3$.

5. The composite element according to claim 4, wherein said at least one mold contains expanded graphite with a density of 0.05 to 0.2 g/cm$^3$.

6. The composite element according to claim 1, wherein said at least one mold contains expanded graphite with a surface weight of 100 to 4,000 g/cm$^2$.

7. The composite element according to claim 1, wherein said at least one mold contains expanded graphite with a surface weight of 500 to 2,000 g/cm$^2$.

8. The composite element according to claim 1, wherein said at least one mold is one of two molds each consisting of expanded graphite connected to one another by way of an inorganic adhesive.

9. The composite element according to claim 8, wherein said a pipe body for conducting a heat transfer medium is embedded between said two molds.

10. The composite element according to claim 1, which further comprises edge protection.

11. The composite element according to claim 10, wherein said edge protection is an L-shaped component made of metal or plastic, a U-shaped component made of metal or plastic or a coating on at least one of the edge sides of the composite element.

12. The composite element according to claim 1, further comprising a frame of metal and/or a non-woven fabric disposed to encase the composite element.

13. A method for producing a thermally conductive composite element, the method comprising:
   i) providing a first plate-shaped premolding and a second plate-shaped premolding, each of the premoldings containing expanded graphite;
   ii) placing a pipe body for conducting a transfer medium between an upper side of the first premolding and a lower side of the second premolding to form a pre-assembly; and
   iii) pressing of the pre-assembly obtained in step ii), applying at least one textile fabric in step i) to at least one of the sides of the premoldings lying opposite a side on which the pipe body is to be placed and/or, subsequent to step iii), applying at least one textile fabric to an upper side and/or a lower side of the assembly obtained in step iii).

14. The method according to claim 13, which comprises carrying out steps i) to iii) for forming the thermally conductive element according to claim 1.

15. The method according to claim 13, further comprising:
   a) applying an inorganic adhesive to the upper side and the lower side of the first premolding;
   b) applying a textile fabric to the upper side or lower side of the first premolding provided with adhesive and placing the pipe body on the side of the first premolding lying opposite the textile fabric;
   c) applying an inorganic adhesive to the upper side or the lower side of the second premolding;
   d) applying a textile fabric to the upper side or lower side of the second premolding provided with adhesive;
   e) placing the second premolding obtained in step d) with its side lying opposite the textile fabric downwards on the pipe body of the assembly obtained in step b); and
   f) pressing of the assembly obtained in step e).

16. The method according to claim 13, wherein step f) comprises pressing at a pressure of 0.02 to 5 MPa.

17. The method according to claim 16, which comprises pressing at a pressure of 0.1 to 1 MPa.

18. The thermally conductive composite element according to claim 1 in combination with, and configured for:
   a surface cooling or surface heating system;
   surface cooling and surface heating of machinery and equipment;
   cooling medical equipment;
   air-conditioning in motor vehicles;
   air-conditioning in ships and aircraft cabins; or
   temperature-control basins in swimming pools.

19. The thermally conductive composite element according to claim 18, wherein:
   the surface cooling or surface heating system comprise underfloor, wall or ceiling heating;
   wherein the machinery and equipment comprise photovoltaic cells, temperature chambers, housings for power electronics, battery cells, battery packs containing lithium-ion battery cells;
   the medical equipment includes CT scanners and MRI scanners; and
   the motor vehicles include buses and heavy-goods vehicles.

20. A thermally conductive composite element for a surface cooling and/or surface heating system, the composite element, comprising:
   two molds containing or consisting of expanded graphite;
   at least one textile fabric disposed on at least one side of at least one of said two molds;
   an inorganic adhesive connecting said at least one textile fabric to said mold; and
   a pipe body for conducting a heat transfer medium embedded between said two molds.

* * * * *